United States Patent
Gaumnitz et al.

(10) Patent No.: US 10,545,936 B2
(45) Date of Patent: Jan. 28, 2020

(54) LINEAR RUN LENGTH ENCODING: COMPRESSING THE INDEX VECTOR

(71) Applicants: Gordon Gaumnitz, Walldorf (DE); Robert Schulze, Walldorf (DE); Lars Dannecker, Dresden (DE); Ivan Bowman, Walldorf (DE); Dan Farrar, Walldorf (DE)

(72) Inventors: Gordon Gaumnitz, Walldorf (DE); Robert Schulze, Walldorf (DE); Lars Dannecker, Dresden (DE); Ivan Bowman, Walldorf (DE); Dan Farrar, Walldorf (DE)

(73) Assignee: SAP SE, Walldorf (DE)

( * ) Notice: Subject to any disclaimer, the term of this patent is extended or adjusted under 35 U.S.C. 154(b) by 12 days.

(21) Appl. No.: 14/326,397

(22) Filed: Jul. 8, 2014

(65) Prior Publication Data

US 2016/0012086 A1 Jan. 14, 2016

(51) Int. Cl.
*G06F 16/22* (2019.01)

(52) U.S. Cl.
CPC ................................ *G06F 16/2228* (2019.01)

(58) Field of Classification Search
None
See application file for complete search history.

(56) References Cited

U.S. PATENT DOCUMENTS

| | | | |
|---|---|---|---|
| 4,585,004 A | 4/1986 | Brownlee | |
| 5,111,816 A | 5/1992 | Pless et al. | |
| 6,772,004 B2 | 8/2004 | Rudy | |
| 7,801,898 B1 * | 9/2010 | Weissman | G06F 17/30613 707/742 |
| 8,452,755 B1 * | 5/2013 | Ye | G06F 17/30442 707/706 |
| 9,197,710 B1 | 11/2015 | Matthews et al. | |
| 2002/0087685 A1 * | 7/2002 | Lassen | H04L 67/32 709/225 |

(Continued)

OTHER PUBLICATIONS

Keogh, E. et. al. "Segmenting Time Series: A Survey and Novel Approach." *Data Mining in Time Series Databases*. World Scientific, 1993. 1-21.

(Continued)

*Primary Examiner* — Kris E Mackes
*Assistant Examiner* — Soheila (Gina) Davanlou
(74) *Attorney, Agent, or Firm* — Mintz Levin Cohn Ferris Glovsky and Popeo, P.C.

(57) ABSTRACT

Linear run length encoding is described. A system and method include storing a table of time series data in a database of a data platform, the table of time series data representing a set of time series blocks. Each time series block of the set of time series blocks has a time series of equally-incremented time intervals and a run length. Each time interval of the time series is associated with one or more values. The run length has a starting position with at least one starting value and an ending position with at least one ending value. The starting position and the at least one starting value is stored for each time series block in a column store of the database. Then, a compressed index is generated in the column store of the database for each time series block, the compressed index comprising the starting position and the at least one starting value.

15 Claims, 8 Drawing Sheets

(56) References Cited

U.S. PATENT DOCUMENTS

| | | |
|---|---|---|
| 2002/0128565 A1 | 9/2002 | Rudy |
| 2006/0004715 A1* | 1/2006 | Lock ................ G06F 17/30595 |
| 2008/0109041 A1 | 5/2008 | de Voir |
| 2011/0218978 A1* | 9/2011 | Hong ................ G06F 17/30551 |
| | | 707/694 |
| 2013/0103657 A1 | 4/2013 | Ikawa et al. |
| 2013/0166566 A1* | 6/2013 | Lemke .............. G06F 17/30483 |
| | | 707/741 |
| 2013/0262411 A1* | 10/2013 | Kadatch ................ G06F 3/0608 |
| | | 707/693 |
| 2014/0040276 A1 | 2/2014 | Chen et al. |
| 2015/0089075 A1 | 3/2015 | Strigeus et al. |
| 2015/0199413 A1 | 7/2015 | Brown et al. |
| 2015/0213072 A1 | 7/2015 | Chen et al. |
| 2015/0317212 A1 | 11/2015 | Lee et al. |
| 2016/0012085 A1 | 1/2016 | Gaumnitz et al. |
| 2016/0012094 A1 | 1/2016 | Gaumnitz et al. |
| 2016/0331471 A1 | 11/2016 | Deno et al. |

OTHER PUBLICATIONS

Komarov O., and Zimmerman, B. "Identifying Gaps in Time-series Data." *MathWorks*. Jul. 18, 2011. Web. Retrieved May 11, 2016. MathWorks.com. (http://www.mathworks.com/matlabcentral/answers/11846-identifying-gaps-in-time-series-data).

* cited by examiner

Meter1:

| Time | 09:00 | 09:15 | 09:30 | 09:45 | 10:00 | ... |
|------|-------|-------|-------|-------|-------|-----|
| KWh  | 5     | 3     | 1     | 5     | 7     | ... |
| Temp | 20    | 21    | 21    | 22    | 23    | ... |

...

Meter n:

| Time | 09:15 | 09:30 | 09:45 | 10:00 | 10:15 | ... |
|------|-------|-------|-------|-------|-------|-----|
| KWh  | 2     | 1     | 4     | 9999  | 0     | ... |
| Temp | 11    | 12    | 9     | 14    | 18    | ... |

| SeriesID | Time  | KWh  | Temp |
|----------|-------|------|------|
| Meter1   | 09:00 | 5    | 20   |
| Meter1   | 09:15 | 3    | 21   |
| Meter1   | 09:30 | 1    | 21   |
| Meter1   | 09:45 | 5    | 22   |
| Meter1   | 10:00 | 7    | 23   |
| ...      | ...   | ...  | ...  |
| Meter n  | 09:15 | 2    | 11   |
| Meter n  | 09:30 | 1    | 12   |
| Meter n  | 09:45 | 4    | 9    |
| Meter n  | 10:00 | 9999 | 0    |
| Meter n  | 10:15 | 14   | 18   |

FIG. 5

LINEAR RUN LENGTH ENCODING: COMPRESSING THE INDEX VECTOR

TECHNICAL FIELD

The subject matter described herein relates to data processing platforms, and more particularly to a system and method for compressing an index vector of series data of a database.

BACKGROUND

FIG. 1 is a block diagram of a data processing system 100. The data processing system 100 includes a data platform 102 that receives and/or transmits data to one or more external data sources 103. The data platform 102 can be, without limitation, a web server including one or more server computers and one or more processors. The external data sources 103 can be, without limitation, client computers including one or more processors, but can also include server computers, mobile computing devices, desktop or laptop computers, and the like.

The data platform 102 includes a storage layer 104 for storing data received from the one or more external data sources 103. The storage layer 104 can include a database, such as an in-memory database or hard-disk drive database. Consistent with implementations described herein, the storage layer 104 further includes a column store 106, and may also include a row store 108. Series data 110, such as time stamps or other serial or regular interval-based data, is preferably stored on column store 106.

When dealing with series data in the storage layer of an data platform, improving memory consumption and general performance in a manner that is virtually transparent to the user, and involves an ease of use when handling this kind of data using an extensive number of time series analysis functionality, is very challenging.

SUMMARY

This document describes various storage extensions, which are specifically adapted to the characteristics and requirements of time series data. The extensions comprise special compression formats for time stamps. In particular, this document describes systems and methods for compressing an index vector of time series tables stored in a database.

In one aspect, a computer-implemented method includes storing a table of time series data in a database of a data platform, the table of time series data representing a set of time series blocks. Each time series block of the set of time series blocks has a time series of equally-incremented time intervals and a run length, each time interval of the time series is associated with one or more values, and the run length has a starting position with at least one starting value and an ending position with at least one ending value. The method further includes storing, by one or more processors of the data platform, the starting position and the at least one starting value for each time series block in a column store of the database.

The method further includes generating, by the one or more processors, a compressed index in the column store of the database for each time series block, the compressed index comprising the starting position and the at least one starting value. The method further includes calculating, by the one or more processors using the compressed index, each time series block of the set of time series blocks, and a run length associated with each time series block based on the equally-incremented time intervals and on the one or more values associated with each time interval of the time series.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5 illustrates a large "skinny table" design of time series tables.

When practical, similar reference numbers denote similar structures, features, or elements.

DETAILED DESCRIPTION

To address these and potentially other issues with currently available solutions, methods, systems, articles of manufacture, and the like consistent with one or more implementations of the current subject matter can, among other possible advantages, provide index vector compression for time series tables of blocks of time series data.

Figure 1:
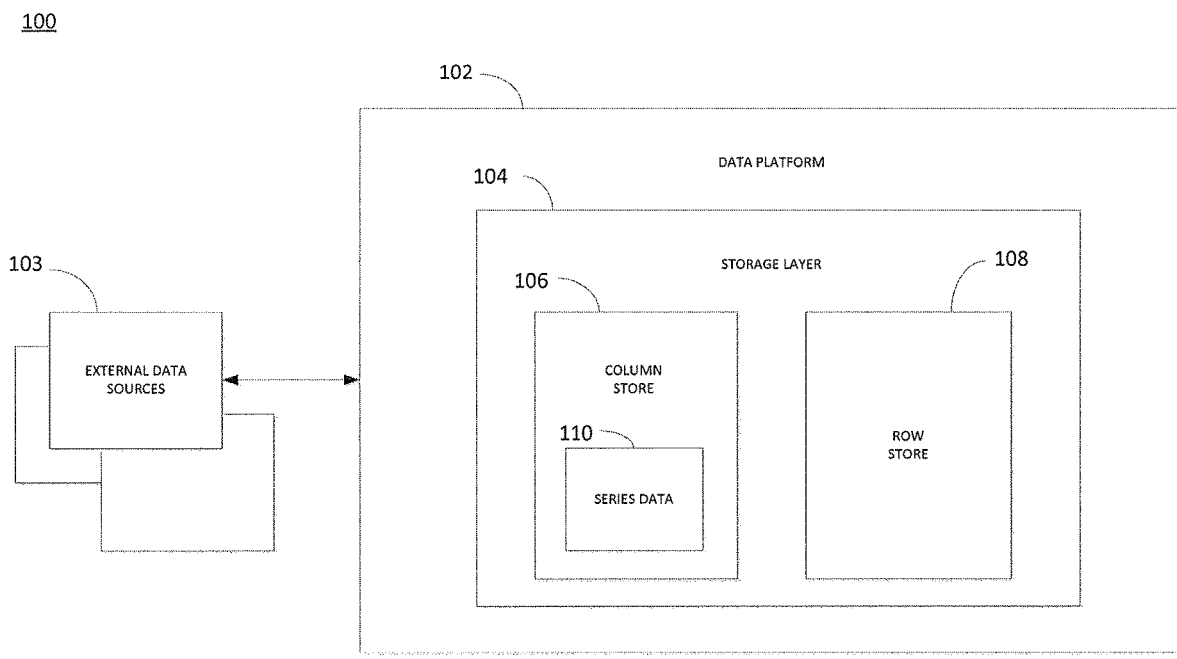
FIG. 1 is a diagram illustrating aspects of a data processing system showing features consistent with implementations of the current subject matter.
Figure 2:
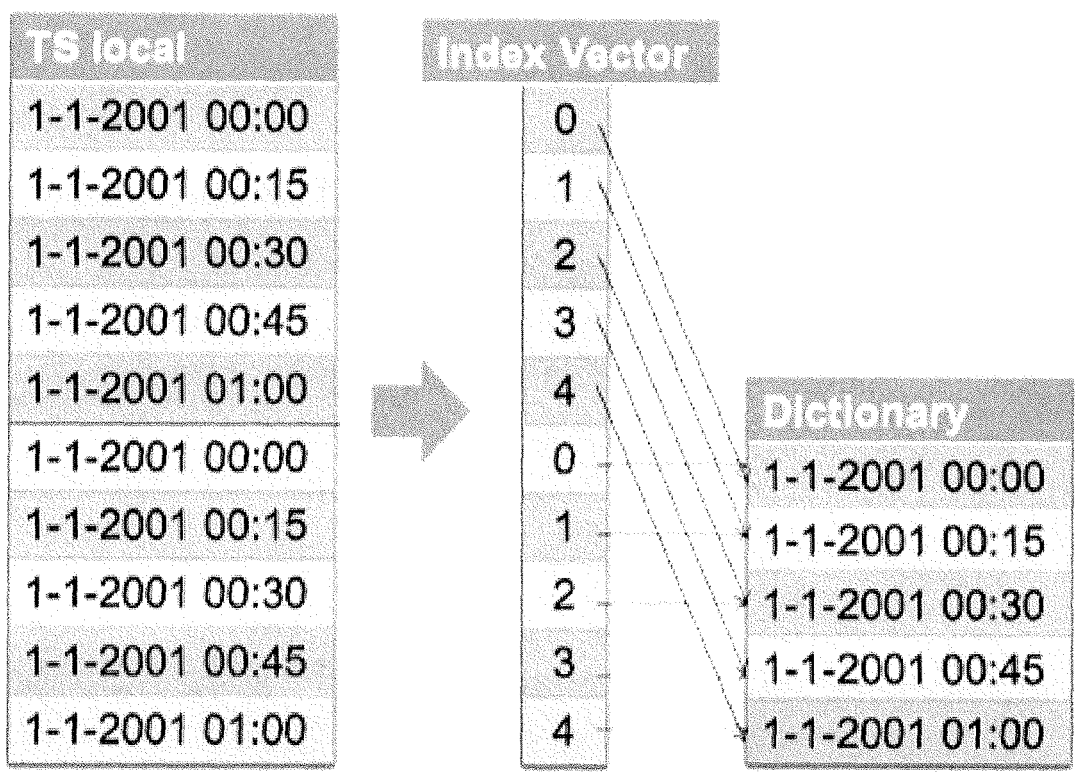
FIG. 2 shows a conventional time stamp dictionary approach.

The database system stores time stamps, typically using standard dictionary encoding. This means that all time stamps considered in the column are stored within a dictionary and that the actual values in the column are replaced by integer references ("value-ids") pointing into the dictionary. When reading dictionary encoded time stamps, the respective value-ids are read in the index-vector, and the respective position is searched for in the dictionary. This is illustrated in FIG. 2. Since all time stamps available in the table are stored in the dictionary, the memory consumption increases linearly with the number of distinct time stamps.

However, memory consumption of equidistant time series can be optimized, since one of their major characteristics is a consistently progressing (increasing or decreasing) time. In particular, adjacent time stamps exhibit equal deltas between them. Thus, using the starting time $T_s$ and the respective time interval I, the timestamp for every entry in the time series at its position i can be calculated.

Figure 3:
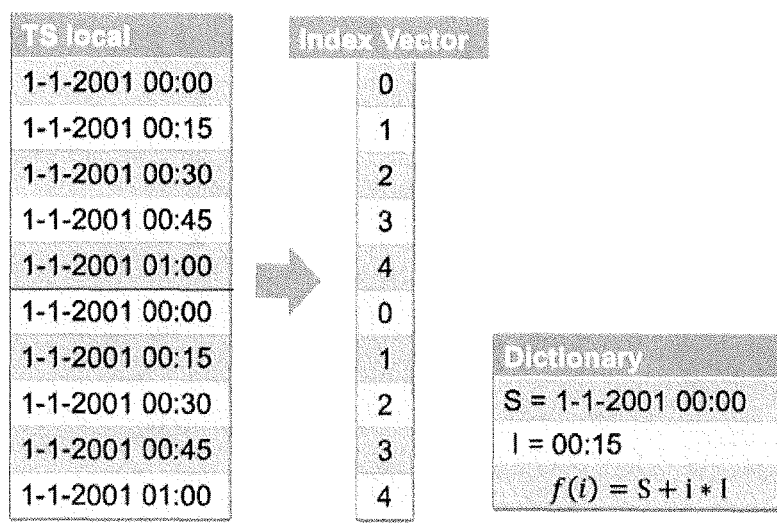
FIG. 3 shows an enhanced time stamp dictionary with constant memory consumption.

Accordingly, in an optimized time series dictionary, only the starting time and the time interval of the time series is stored, instead of storing the actual time stamps. Furthermore, the index vector for an equidistant time series exactly represents the entry positions within the time series, resulting in a likewise constantly increasing or decreasing sequence of index values. This approach is illustrated in FIG. 3. When reading values from the series table, the time stamps can be determined as:

$$T_i = i*I + T_s$$

With this optimization, the dictionary is constant in size, instead of increasing linearly with the number of time stamps.

One major requirement of the time series dictionary is that it needs to contain a complete, gapless, consecutive sequence of time stamps. A missing time stamp is not supported and will break the dictionary, since in this case the index value no longer complies with the positions of the time stamps in a time series. As a result, while the dictionary supports missing values in a subset of time series contained in a table, it does not support gaps in the timestamps. In this regard, a gap in the time stamps of a (multi-variate) time series means that all sub time series considered in a table do not exhibit a value for a specific time stamp given by the natural time stamp sequence. Thus, a gap breaks the requirement of the current dictionary approach that it needs to contain all distinct time stamps form a gapless, consecutive, ordered sequence. Since some use-cases also need support for gaps in time series, the dictionary compression can be further enhanced to support this special case.

Figure 4:
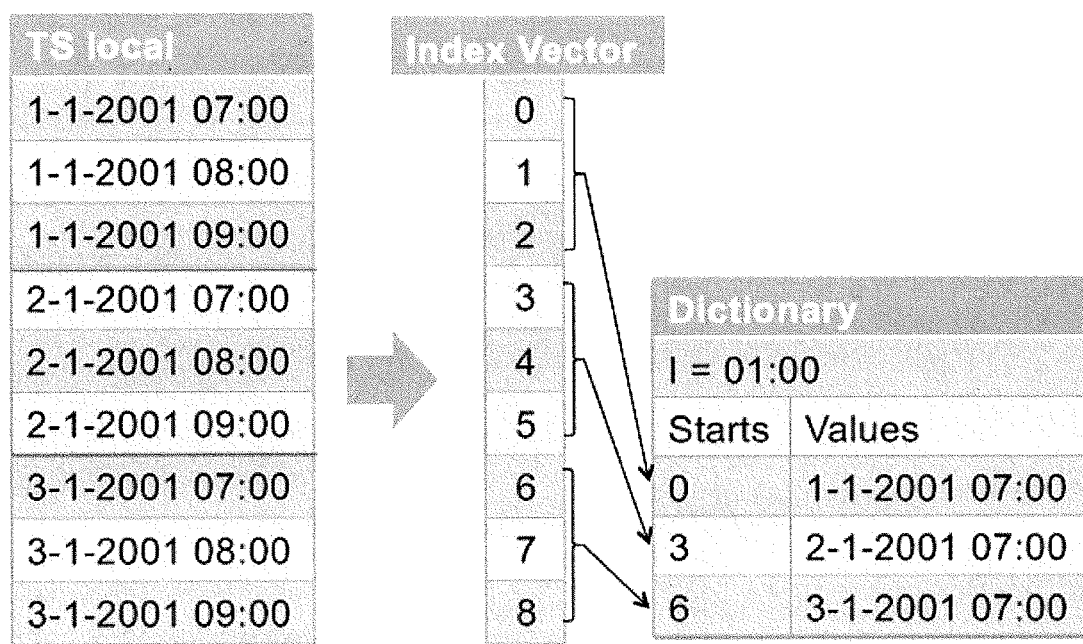
FIG. 4 shows the enhanced time stamp dictionary with constant memory consumption with support for gaps.

In accordance with implementations consistent with the compression techniques described herein, the time stamps are divided into multiple blocks, where each block contains only a gapless sequence of time stamps. For this purpose, the time stamps are divided directly at the borders of the gaps existing in a time series. The support for multiple blocks comes with the requirement of storing the starting points as well as the first value of each block. In principal, this approach can be seen as having multiple sub-dictionaries each storing the time stamps of separate strictly equidistant time series. This is illustrated in FIG. 4.

The starts-vector connects the index values of the index-vector to the respective blocks. The values vector describes the respective starting time stamp for each of the blocks. Thus, given a specific index vector value, the starts vector is first scanned until the respective block in which the value is contained is found. With that, the position of the starting value of the respective block in the starting values vector is retrieved. With those two units of information, the time stamps are calculated as described for the general time series dictionary.

Adding gap support increases the memory consumption of the dictionary compared to the constant memory consumptions of the standard time series dictionary, since the two additional vectors "starts" and "starting values" consume additional memory. Thus, the memory consumption of the dictionary in the latter case depends on the number of blocks, and therefore, indirectly on the number of gaps that are present in the data. In addition, operations on the dictionary are now required to access two additional vectors. Scanning the starts vector, for example, requires a binary search with a complexity of log(n), where n is the number of values considered, instead of a constant complexity when accessing values in the former approach.

While an equidistant time series is preferably used, the techniques described above can apply to a dictionary that supports regular gaps, such as no data records on holidays, data only being available during working days (i.e., excluding weekends), and/or data only being recorded during defined hours per day (i.e., business hours). Additional layers can be added on top of the above-described implementations to allow for a faster access to requested timestamps.

Using dictionary compression, the original time stamps in the respective columns are replaced by integer values serving as index pointers to the dictionary. Such an index vector is illustrated in FIGS. 2 and 3. Index vectors are typically subject to run length encoding, which is especially efficient when consecutive values repeat within the respective columns. However, this conflicts with some table designs for time series data—namely, large skinny tables. FIG. 5 illustrates one such table design, in which time series data from multiple meters are stored.

Data in the table is ordered first by the id of the respective series, and afterwards by time stamp. It can be seen that the series id is suited for run length encoding, since the values repeat for the entire time series of a meter. However, for the resulting index vector of the respective time stamp columns, incrementing integer values forming "blocks" of length $n=a_1, \ldots a_n$ with $a_i = a_{i-1} + / - 1$ are often observed. The reason is that equidistant time series typically exhibit a continuously increasing time.

Figure 6:
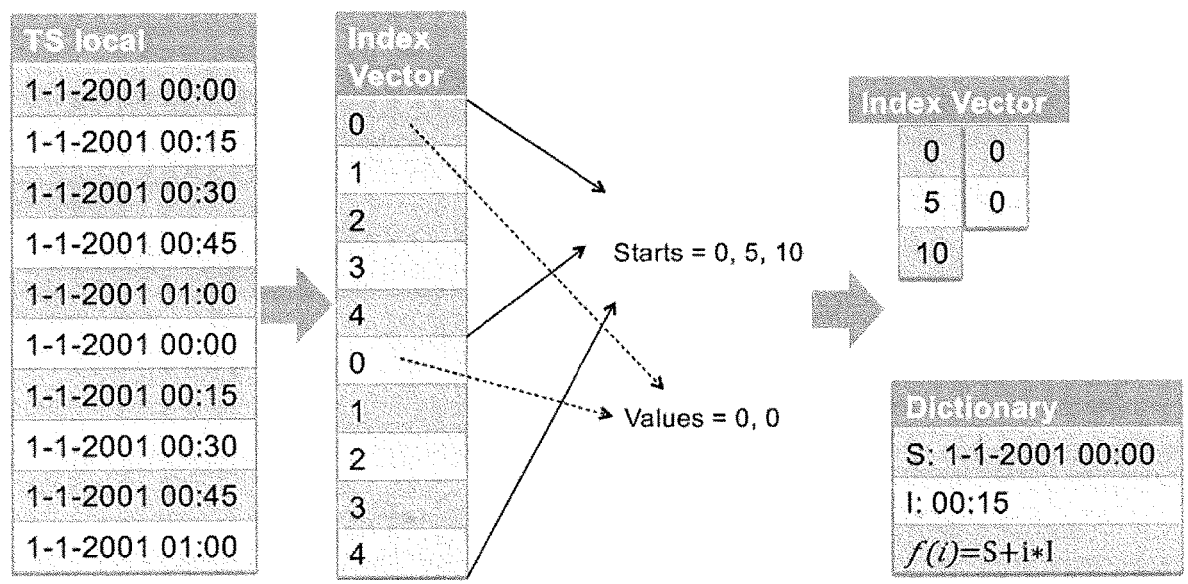
FIG. 6 shows a general design of linear run length encoding (LRLE).
Figure 7:
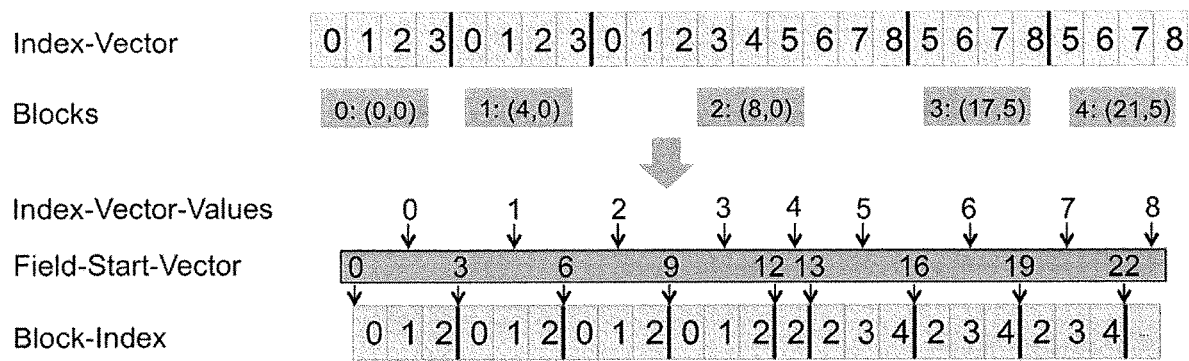
FIG. 7 shows an implementation of LRLE, with a two-level block index.

This behavior can be used to create a variant of the standard RLE compression specifically tailored to the incrementing/decrementing behavior of time series index vectors. This variation is called linear run length encoding (LRLE), and is illustrated in FIG. 6.

With LRLE, instead of storing the single index values for each meter, only characteristic information about the blocks that follow the simple increment rule is stored. For this purpose, only two data elements (integer values) per block is needed, namely, the position of the starting element of a block, and the value with which the block starts. Accordingly, the following pair of information is stored:

INDEX_BLOCK::=(startPosition,firstElement)

With these two pieces of information, the following other information can be calculated: the block in which an index value is contained, specific time stamp values using the standard time series dictionary calculation rule, and the length of specific blocks by using the start position of the requested and the following block.

Using the start positions and the first elements as an information pair has the advantage that the index in the vector comprising the start positions directly corresponds to the block number (block number −1, due to zero-based vector indexes). Thus, the starting value for the first block can be found at index position 0 and for the sixth block at index position 7. With that a linear access to the starting values vector is enabled, instead of requiring a binary search to find the respective position. The last entry in the starting values vector marks the end of the all runs and does not have an entry in the first elements vector.

The compressed data is stored using two vectors, one containing the starting positions and one containing the starting values.

```
vector<int> startPositions;
vector<int> firstElements;
```

This implementation ensures consistency between both vectors, as well as consistency of the index vector at all times. However, the most common operation with respect to time series data is a simple append, which does not spoil the consistency of the index vector in the LRLE implementation.

In some implementations, the index vector compression can be further enhanced in which appending values does not recreate the entire index vector, and appending values simply adds an additional entry at the end of the index vector by either increasing the end marker or starting a new block. In the time series case, this is also true for the startingValues and firstElements vectors. Further, this behavior is supported by adding a special method to the current index vector implementation, or by adding a special custom merge.

In an alternative implementation for implementing the LRLE compression, a vector of structs containing both pieces of information—the starting position as well as the value of the first element can be used, as follows:

```
struct index_block {
    int startPosition;
    int firstElement;
} ;
vector<index_block> indexVector;
```

Figure 8:
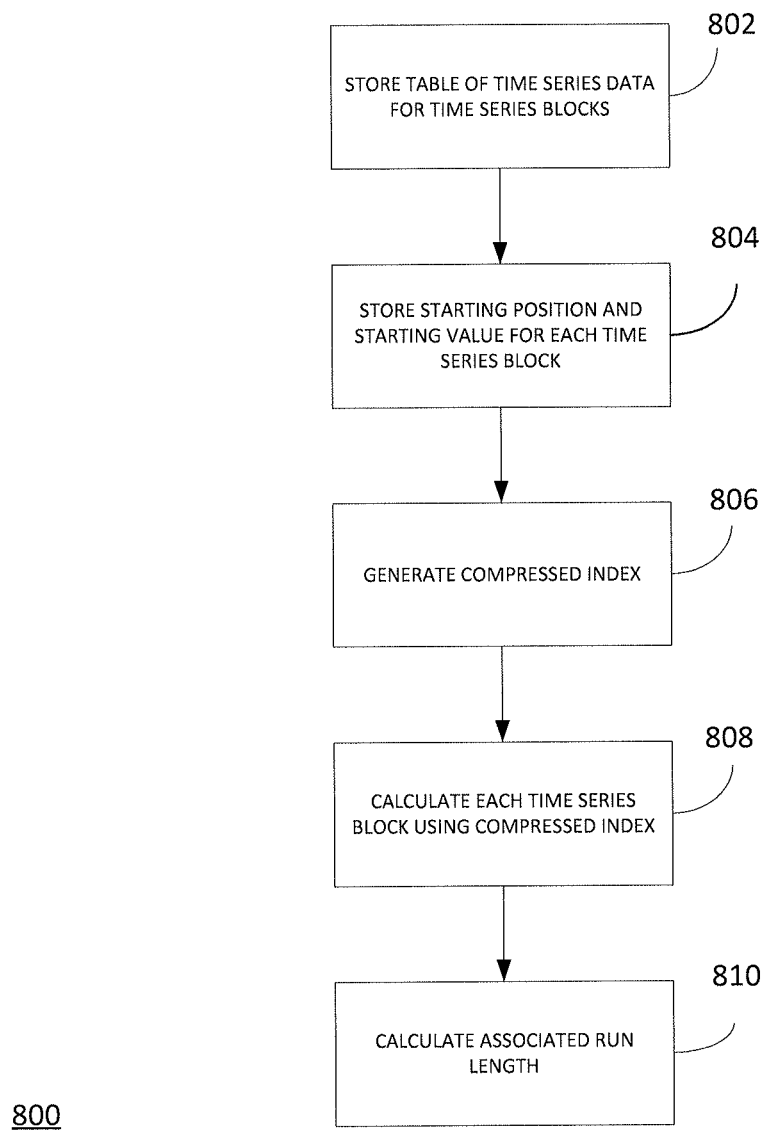
FIG. 8 is a process flow diagram illustrating aspects of a method having one or more features consistent with implementations of the current subject matter.

FIG. 8 is a flowchart of a method for compressing an index vector for linear run length encoding. At 802 a table of time series data is stored in a database of a data platform, where the table of time series data represents a set of time series blocks. Each time series block of the set of time series blocks has a time series of equally-incremented time intervals and a run length, and each time interval of the time series is associated with one or more values. The run length has a starting position with at least one starting value and an ending position with at least one ending value. At 804, one or more processors of the data platform store the starting position and the at least one starting value for each time series block in a column store of the database.

At 806, the one or more processors generate a compressed index in the column store of the database for each time series block. The compressed index includes the starting position and the at least one starting value. At 808, the one or more processors calculate, using the compressed index, each time series block of the plurality of time series blocks, and at 810, the one or more processors calculate a run length associated with each time series block based on the equally-incremented time intervals. The calculation of the run length can be further based on the one or more values associated with each time interval of the time series.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean, "based at least in part on," such that an unrecited feature or element is also permissible. Other implementations may be within the scope of the following claims.

What is claimed is:

1. A computer-implemented method comprising:
    storing a table of time series data in a database of a data platform, the table of time series data representing a plurality of time series blocks for a column of the table, each time series block of the plurality of time series blocks corresponding to an equidistant time series, each equidistant time series having a plurality of timestamp values in which each of the plurality of timestamp values are separated by one or more increments of a same time interval, each equidistant time series having a starting position associated with a starting timestamp value and an ending position associated with an ending timestamp value;
    storing, by one or more processors of the data platform and in a dictionary of the column of the database, the starting timestamp value, the time interval separating the plurality of timestamp values in each equidistant time series, and a function for determining, based on the starting timestamp and the time interval, one or more of the plurality of timestamp values in each equidistant time series for the column of the table;
    generating, by the one or more processors, a two-column compressed index for the column of the database for each time series block, the two-column compressed index comprising a first column and a second column, the first column comprising the starting position and the second column comprising a corresponding starting value for the corresponding starting position;
    accessing, in response to a query to the data platform, the two-column compressed index to obtain the starting position and the starting value;
    determining a time stamp, the determining based at least on the accessed starting position, the accessed starting value, and the dictionary; and
    executing, by the one or more processors, the query based at least on the determined timestamp value.

2. The computer implemented method in accordance with claim 1, further comprising:
    calculating, by the one or more processors using the two-column compressed index, each time series block of the plurality of time series blocks.

3. The computer implemented method in accordance with claim 2, further comprising calculating, by the one or more processors, a run length associated with each equidistant time series based at least on the starting position of each equidistant time series.

4. The computer implemented method in accordance with claim 3, wherein the calculation of the run length is further based on the time interval separating the plurality of timestamp values in each equidistant time series.

5. The computer implemented method in accordance with claim 1, wherein the database includes an in-memory database having a hybrid store structure, the hybrid store structure comprising a column store and a row store.

6. A computer program product comprising a non-transient machine-readable medium storing instructions that, when executed by at least one programmable processor, cause the at least one programmable processor to perform operations comprising:
    store a table of time series data in a database of a data platform, the table of time series data representing a plurality of time series blocks for a column of the table, each time series block of the plurality of time series blocks corresponding to an equidistant time series, each equidistant time series having a plurality of timestamp values in which each of the plurality of timestamp values are separated by one or more increments of a same time interval, each equidistant time series having a starting position associated with a starting timestamp value and an ending position associated with an ending timestamp value;
    store, in a dictionary of the column of the database, the starting timestamp value, the time interval separating the plurality of timestamp values in each equidistant time series, and a function for determining, based on the starting timestamp and the time interval, one or more of the plurality of timestamp values in each equidistant time series for the column of the table;
    generate a two-column compressed index for the column of the database for each time series block, the two-column compressed index comprising a first column and a second column, the first column comprising the starting position and the second column comprising a corresponding starting value for the corresponding starting position;

access, in response to a query to the data platform, the two-column compressed index to obtain the starting position and the starting value;

determine a time stamp, the determining based at least on the accessed starting position, the accessed starting value, and the dictionary; and execute the query based at least on the determined timestamp value.

7. The computer program product in accordance with claim 6, wherein the operations further comprise an operation to calculate, using the two-column compressed index, each time series block of the plurality of time series blocks.

8. The computer program product in accordance with claim 7, wherein the operations further comprise an operation to calculate a run length associated with each equidistant time series based at least on the starting position of each equidistant time series.

9. The computer program product in accordance with claim 8, wherein the calculation of the run length is further based on the time interval separating the plurality of timestamp values in each equidistant time series.

10. The computer program product in accordance with claim 6, wherein the database includes an in-memory database having a hybrid store structure, the hybrid store structure comprising a column store and a row store.

11. A system comprising:
at least one programmable processor; and
a non-transient machine-readable medium storing instructions that, when executed by the at least one processor, cause the at least one programmable processor to perform operations comprising:
storing a table of time series data in a database of a data platform, the table of time series data representing a plurality of time series blocks for a column of the table, each time series block of the plurality of time series blocks corresponding to an equidistant time series, each equidistant time series having a plurality of timestamp values in which each of the plurality of timestamp values are separated by one or more increments of a same time interval, each equidistant time series having a starting position associated with a starting timestamp value and an ending position associated with an ending timestamp value;

storing, by one or more processors of the data platform and in a dictionary of the column of the database, the starting timestamp value, the time interval separating the plurality of timestamp values in each equidistant time series, and a function for determining, based on the starting timestamp and the time interval, one or more of the plurality of timestamp values in each equidistant time series for the column of the table;

generating, by the one or more processors, a two-column compressed index for the column of the database for each time series block, the two-column compressed index comprising a first column and a second column, the first column comprising the starting position and the second column comprising a corresponding starting value for the corresponding starting position;

accessing, in response to a query to the data platform, the two-column compressed index to obtain the starting position and the starting value;

determining a time stamp, the determining based at least on the accessed starting position, the accessed starting value, and the dictionary; and executing, by the one or more processors, the query based at least on the determined timestamp value.

12. The system in accordance with claim 11, wherein the operations further comprise calculating, using the two-column compressed index, each time series block of the plurality of time series blocks.

13. The system in accordance with claim 12, wherein the operations further comprise calculating a run length associated with each equidistant time series based at least on the starting position of each equidistant time series.

14. The system in accordance with claim 13, wherein the calculation of the run length is further based on the time interval separating the plurality of timestamp values in each equidistant time series.

15. The system in accordance with claim 11, wherein the database includes an in-memory database having a hybrid store structure, the hybrid store structure comprising a column store and a row store.

\* \* \* \* \*